US012496578B2

(12) United States Patent
Dangla et al.

(10) Patent No.: US 12,496,578 B2
(45) Date of Patent: Dec. 16, 2025

(54) ASSEMBLY FOR PRESSURE CONTROLLED FLUID RELEASE AND ITS METHOD THEREFORE

(71) Applicant: STILLA TECHNOLOGIES, Villejuif (FR)

(72) Inventors: Rémi Dangla, Paris (FR); Nicolas Fernandez, Paris (FR); Étienne Fradet, Arcueil (FR); Gwilherm Jaspard, Villejuif (FR)

(73) Assignee: Stilla Technologies, Villejuif (FR)

(*) Notice: Subject to any disclaimer, the term of this patent is extended or adjusted under 35 U.S.C. 154(b) by 940 days.

(21) Appl. No.: 17/606,430

(22) PCT Filed: Apr. 22, 2020

(86) PCT No.: PCT/EP2020/061213
§ 371 (c)(1),
(2) Date: Oct. 25, 2021

(87) PCT Pub. No.: WO2020/216791
PCT Pub. Date: Oct. 29, 2020

(65) Prior Publication Data
US 2022/0193671 A1 Jun. 23, 2022

(30) Foreign Application Priority Data
Apr. 26, 2019 (EP) .................................... 19305538

(51) Int. Cl.
*B01L 3/00* (2006.01)

(52) U.S. Cl.
CPC ..... *B01L 3/502715* (2013.01); *B01L 3/50853* (2013.01); *B01L 2200/0689* (2013.01); *B01L 2300/042* (2013.01); *B01L 2400/0487* (2013.01)

(58) Field of Classification Search
CPC ........... B01L 3/502715; B01L 3/50853; B01L 2200/0689; B01L 2300/042;
(Continued)

(56) References Cited

U.S. PATENT DOCUMENTS 6,589,790 B1 * 7/2003 Colin .................... B01L 3/5025 422/417
9,133,009 B2 9/2015 Baroud et al.
(Continued)

FOREIGN PATENT DOCUMENTS

EP 1711590 10/2006
EP 2514528 A1 10/2012
(Continued)

OTHER PUBLICATIONS

International Preliminary Report on Patentability issued Jul. 8, 2021, for PCT Application No. PCT/EP2020/06123, filed Apr. 22, 2020, 14 pages.
(Continued)

*Primary Examiner* — John McGuirk
(74) *Attorney, Agent, or Firm* — Panitch Schwarze Belisario & Nadel LLP; Erin M. Dunston

(57) ABSTRACT

The invention relates to an assembly for contactless pressure-controlled release of a fluid comprising a non-compressible compartment, at least two fluids in fluidic contact and enclosed inside the non-compressible compartment, one of the two fluids being compressible, and one channel for fluid flow.

15 Claims, 7 Drawing Sheets

(58) Field of Classification Search
CPC ....... B01L 2400/0487; B01L 2200/027; B01L 2200/0615; B01L 2300/047; B01L 2400/0688; B01L 3/508; B01L 3/0241
See application file for complete search history.

(56) References Cited

U.S. PATENT DOCUMENTS

| | | | | |
|---|---|---|---|---|
| 2001/0021824 | A1* | 9/2001 | Marsh ................ | A61B 17/3401<br>604/170.03 |
| 2012/0027648 | A1 | 2/2012 | Samper et al. | |
| 2015/0132841 | A1 | 5/2015 | Sampson et al. | |
| 2017/0014826 | A1 | 1/2017 | Engel et al. | |
| 2017/0021347 | A1 | 1/2017 | Kang et al. | |
| 2018/0298324 | A1* | 10/2018 | Takeda .................. | C12M 47/06 |
| 2020/0323473 | A1* | 10/2020 | Berthier ........... | A61B 5/150412 |

FOREIGN PATENT DOCUMENTS

| | | | |
|---|---|---|---|
| WO | 2005066327 | A1 | 7/2005 |
| WO | 2020216791 | A1 | 10/2020 |

OTHER PUBLICATIONS

International Search Report and Written Opinion, mailed Jun. 24, 2020, for PCT Application No. PCT/EP2020/06123, filed Apr. 22, 2020, 14 pages.

* cited by examiner

ASSEMBLY FOR PRESSURE CONTROLLED FLUID RELEASE AND ITS METHOD THEREFORE

CROSS REFERENCE TO RELATED APPLICATIONS

This application is a national stage application under 35 U.S.C. § 371 of International Application No. PCT/EP2020/061213, filed internationally on Apr. 22, 2020 which claims priority benefits to EP Application Serial No. 19305538.1 filed Apr. 26, 2019, the contents of each of which are incorporated herein by reference in their entirety.

FIELD OF INVENTION

The present invention relates to a microfluidic chip cap for contactless and precise droplet deposit in the chip. The device according to the invention is particularly suitable for microfluidic chips used for the generation of aqueous droplets for nucleic acid amplification and analysis.

BACKGROUND OF INVENTION

Microfluidic processes often employ an emulsion, which contains droplets of a dispersed liquid phase surrounded by an immiscible continuous liquid phase. Droplets may be used as reaction vessels for chemical or biological reactions, as storage vessels, and/or as a method to isolate and compartmentalize molecules, such as chemical or biological elements. With proper chemicals such as surfactants on the surface of the droplets, droplets may be made "stable", meaning they are substantially prevented from mixing and merging when in contact with each other. This stability allows one to create a population or library of droplets composed of different chemical or biological components that may be stored in the approximately same volume of space without mixing or contamination between and/or among the components of one droplet and another.

Such microfluidic processes and apparatus are known for instance from the US patent U.S. Pat. No. 9,133,009 which relates to a device for forming droplets in a microfluidic circuit, in particular microdroplets and nanodroplets of size that lies in the range a few hundreds of nanometers to a few hundreds of micrometers. According to this invention, the invention apparatus comprises a chamber containing a first fluid and defined by two opposite walls that diverge relative to each other in at least one given direction, and a microchannel containing a second fluid and leading into a zone of said chamber that is upstream relative to the given direction, the outlet of the microchannel into the chamber constituting an enlargement in the flow section for the second fluid, and the enlargement giving rise to droplets of the second fluid forming within the first fluid. The microdroplets obtained by this process are suitable for the use in elevated temperature but are exposed to evaporation phenomena before the boiling point is reached.

Indeed, during elevated temperatures processes used for example in PCR (Polymerase Chain Reaction) for the generation of aqueous droplets for nucleic acid amplification and analysis, the continuous phase is subject to evaporation phenomena, resulting in loss of a significant part of the reaction vessel's volume.

A solution to this problem can be found in patent EP1711590 disclosing an apparatus for processing biological samples comprising means for processing at least one biological sample accommodated on at least one carrier member in a chamber, characterized in that at least one reservoir able to accommodate a fluid is arranged on a surface inside the chamber adjacent to and/or facing a substantial part of the at least one biological sample. Preferably the apparatus comprises a bottom member arranged to support at least one carrier member carrying at least one biological sample and a lid including at least one fluid reservoir. The reservoir filled with water provides humidity to the chamber and impedes drying out of the sample. The saturated atmosphere within the chamber prevents evaporation of the sample. However, manipulating chips for analysis with thermal processes in a saturated atmosphere chamber can be challenging.

Various devices are known in prior art to handle liquids in microfluidic chips. European Patent Application EP2514528 discloses a device to mix a fluid contained in a syringe with another fluid contained in a vial through channels of a microfluidic chip on which syringe and vial are connected.

US patent application US2017/0014826 discloses a microfluidic chip designed to solubilize material in solution. Liquid is introduced in small reservoirs containing freeze-dried matter. However, fluid is handled in this device with direct contact between reservoirs and liquid source.

US patent application US2012/0027648 discloses an interfacing cap to connect a vessel with a microfluidic chip, allowing to pump liquid from the vessel into the chip.

Besides, devices generally known as "Pasteur pipette" are known to deliver liquids by application of pressure through a deformable chamber containing air. In these devices an operator or a mechanical controller presses the chamber.

However, none of these devices are suitable to release fluid droplets on a chip in a contactless manner as disclosed here.

The assembly disclosed herein has substantial advantages over the prior art to prevent evaporation. The advantages may include:

- Avoiding the formation of an air bubble inside the microfluidic chip,
- Avoiding evaporation phenomena during thermal processes or pressures cycles that the microfluidic chip can be subject to,
- Enabling a new process that could be automatized and/or parallelized, and/or.
- Allowing a contactless and precise method for the avoidance of evaporation dispensing a given amount of liquid without a contact between the controller and the liquid nor between the controller and reservoir (non-compressible compartment) of liquid.

SUMMARY

This invention thus relates to an assembly for contactless pressure-controlled release of a fluid comprising:

- a non-compressible compartment,
- at least two fluids in fluidic contact and enclosed inside the non-compressible compartment, one of the two fluids being gas, wherein the fluid to be released has a density superior to the compressible fluid,
- one channel for fluid flow, said channel extending outward said non-compressible compartment, said channel being in contact with the fluid to be released on the non-compressible compartment side and said channel having a free end on the other side.

In a preferred embodiment it also relates to an assembly for contactless pressure-controlled release wherein the non-compressible compartment is a macrofluidic reservoir with a section S1 in $m^2$ and a Bond number $$\frac{\Delta\rho \times g \times S1}{\sigma}$$

strictly greater than 1, where:

- Δρ is the difference in $kg/m^3$ of the densities between the compressible fluid and the fluid to be released,
- g is the gravitational acceleration which value is 9.80665 m/s2,
- σ is the surface tension in N/m between the compressible fluid and the fluid to be released.

In another embodiment, the non-compressible compartment is a macrofluidic reservoir with a section S1 greater than 10 $mm^2$. Actually, with usual fluids, densities and surface tension are such that section S1 greater than 10 $mm^2$ corresponds to a Bond number greater than 1.

In a preferred embodiment, the channel is a microfluidic channel unable to allow a simultaneous double flow with a section S2 in $m^2$ and a Bond number $$\frac{\Delta\rho \times g \times S2}{\sigma}$$

strictly lower than 1, where Δρ, g and σ are the same as above.

In another embodiment, the channel is a microfluidic channel with a section S2 less than 1 $mm^2$. Actually, with usual fluids, densities and surface tension are such that section S2 less than 1 $mm^2$ corresponds to a Bond number lower than 1.

Ideally, the invention relates to an assembly for contactless pressure-controlled release wherein the compressible fluid is air. For simplicity, using air is the most practical option to have a compressible gas for the invention. Using another gas would imply a more complicated process to inject it within the compartment of the invention, but could be of interest if inert gas is required.

In another alternative, the invention concerns an assembly for contactless pressure-controlled release wherein the fluid to be released is a liquid, and preferably that liquid is an oil. This is very useful as it decreases costs. Besides, oil is an optimum in terms of viscosity, allowing to deliver droplets of well controlled volume with the geometric definition of the channel. In an embodiment, the liquid or oil is non-volatile, which means here that boiling point under pressure of 1 atm is greater than 80° C. Boiling point under pressure of 1 atm is preferably greater than 100° C., more preferably greater than 150° C., even more preferably greater than 150° C. Liquids or oils having boiling point under pressure of 1 atm greater than 200° C. or 250° C. are especially preferred. Such liquids or oils having an ability to avoid evaporation allows operations in high temperature conditions for few hours.

In a preferred embodiment, the assembly for contactless pressure-controlled release according to the invention is such that the non-compressible compartment is obtained by fitting a cap with a base and a lateral wall external surface, to a fluid receiving vessel comprising the channel for fluid flow and lateral wall internal surface, so that the cap lateral wall external surface and the fluid receiving vessel lateral wall internal surface form a fluid tight seal. Thanks to such approach the assembly according to the invention easily obtained instead of injecting through channel the fluid to be further released under pressure.

In a preferred embodiment, the assembly for contactless pressure-controlled release according to the invention is such that the base of the cap has a flat external surface so as to be stable on a horizontal surface for easy filling of the fluid to be released.

The invention also covers a device for contactless pressure-controlled release of a fluid comprising at least one array of assemblies, the assemblies being linked to one another by connecting means. This allows multiple use of the invention with either same analytes or different analytes. Time is saved by filling all receiving vessels for one single pressure cycle.

In a preferred embodiment, the device for contactless pressure-controlled release of a fluid according to the invention comprises a plurality of parallel arrays of assemblies, the parallel arrays of assemblies being linked to one another by at least one connecting bridge. This increases the number of samples that can be analyzed.

Preferably, the device has a seal on channel to prevent the fluid from escaping before pressure control. The device according to the invention can therefore be supplied separately for mere liquid dispensing purpose without any fluid to be dispensed leaking risk.

The invention relates also to an apparatus comprising an assembly according to the invention or a device according to the invention, the apparatus further comprising a pressure controller implemented to provide the compressible fluid enclosed in the non-compressible compartment with a pressure so as to release the fluid through the channel from the fluid receiving vessel to a well such as a loading well.

It is another objective of the invention to provide the method for forming an assembly of the invention, the method comprising the following steps:

- Filling a cap comprising a base and a lateral wall external surface with the fluid to be released,
- Fitting said cap with a receiving vessel comprising a channel for fluid flow and lateral wall internal surface, so that the cap lateral wall external surface and the fluid receiving vessel lateral wall internal surface form a fluid tight seal.

In a preferred embodiment, the method according to the invention further comprises the steps of:

- Setting the assembly obtained into an apparatus comprising a pressure controller in a configuration where the cap is on top of the receiving vessel,
- Implementing a pressure cycle so as to release the fluid from the fluid receiving vessel to a well such as a loading well.

Preferably, the method for contactless pressure-controlled release of a fluid according to the invention also includes a step wherein the pressure cycle comprises a pressure increase of at least 20 mbar to a maximum of 2 bars from atmospheric pressure for gas inlet into the non-compressible compartment followed by a pressure decrease back to initial atmospheric pressure for gas expansion and release of fluid from the fluid receiving vessel to a well such as a loading well.

Alternatively, the pressure cycle may be the opposite, i.e.: a pressure decrease of at least 20 mbar to a maximum of 2 bars from atmospheric pressure for fluid aspiration from the fluid receiving vessel to a well followed by a pressure increase back to initial atmospheric pressure.

Definitions

In the present invention, the following terms have the following meanings:

The term "amplicon" refers to a product of an amplification reaction. An amplicon may be single-stranded or double-stranded, or a combination thereof. An amplicon corresponds to any suitable segment or the entire length of a nucleic acid target.

The term "compressible" for the fluids of the invention is to be understood in reference to a non-compressible fluid. An incompressible fluid is defined in the invention by a isothermal compressibility (relative volume variation) lower than $10^{-6}$ $Pa^{-1}$.

The term "amplification" refers to a reaction in which replication occurs repeatedly over time to form multiple copies of at least one segment of a template molecule. Amplification may generate an exponential or linear increase in the number of copies as amplification proceeds. Typical amplifications produce a greater than 1,000-fold increase in copy number and/or signal. Exemplary amplification reactions for the droplet-based assays disclosed herein may include the polymerase chain reaction (PCR) or ligase chain reaction, each of which is driven by thermal cycling. The droplet-based assays also or alternatively may use other amplification reactions, which may be performed isothermally, such as branched-probe DNA assays, cascade rolling circle amplification (cascade-RCA), helicase-dependent amplification, loop-mediated isothermal amplification (LAMP), nucleic acid based amplification (NASBA), nicking enzyme amplification reaction (NEAR), PAN-AC, Q-beta replicase amplification, rolling circle amplification (RCA), self-sustaining sequence replication, strand-displacement amplification, and the like. Amplification may utilize a linear or circular template. Amplification may be performed with any suitable reagents. Amplification may be performed, or assayed for its occurrence, in an amplification mixture, which is any composition capable of generating multiple copies of a nucleic acid target molecule, if present, in the composition. An "amplification mixture" may include any combination of at least one primer or primer pair, at least one probe, at least one replication enzyme (e.g., at least one polymerase, such as at least one DNA and/or RNA polymerase), and deoxynucleotide (and/or nucleotide) triphosphates (dNTPs and/or NTPs), among others.

The term "microfluidic channel" means a channel where it is impossible to have a simultaneous double flow vertically, as an example, air can flow upwardly while oil flows downwardly. This is obtained when the Bond number $$\frac{\Delta\rho \times g \times S}{\sigma}$$

is strictly lower than 1.

The term "analyte" refers to a component(s) or potential component(s) of a sample that is analyzed in an assay. An "analyte" is a specific subject of interest in an assay where the "sample" is the general subject of interest. An analyte may, for example, be a nucleic acid, protein, peptide, enzyme, cell, bacteria, spore, virus, organelle, macromolecular assembly, drug candidate, lipid, carbohydrate, metabolite, or any combination thereof, among others. An analyte may be assayed for its presence, activity and/or other characteristic in a sample and/or in partitions thereof. The presence of an analyte may relate to an absolute or relative number, concentration, binary assessment (e.g., present or absent), or the like, of the analyte in a sample or in one or more partitions thereof. In some examples, a sample may be partitioned such that a copy of the analyte is not present in all of the partitions, such as being present in the partitions at an average concentration of about 0.0001 to 10000, 0.001 to 1000, 0.01 to 100, 0.1 to 10, or one copy per partition.

The term "assay" refers to a procedure(s) and/or reaction(s) used to characterize a sample, and any signal(s), value(s), data, and/or result(s) obtained from the procedure(s) and/or reaction(s). Exemplary droplet-based assays are biochemical assays using aqueous assay mixtures. More particularly, the droplet-based assays may be enzyme assays and/or binding assays, among others. The enzyme assays may, for example, determine whether individual droplets contain a copy of a substrate molecule (e.g., a nucleic acid target) for an enzyme and/or a copy of an enzyme molecule. Based on these assay results, a concentration and/or copy number of the substrate and/or the enzyme in a sample may be estimated.

The term "channel" refers to an elongate passage for fluid travel. A channel generally includes at least one inlet, where fluid enters the channel, and at least one outlet, where fluid exits the channel. The functions of the inlet and the outlet may be interchangeable (i.e., fluid may flow through a channel in only one direction or in opposing directions, generally at different times). A channel may include walls that define and enclose the passage between the inlet and the outlet. A channel may, for example, be formed by a tube (e.g., a capillary tube), in or on a planar structure (e.g., a chip), or a combination thereof. A channel may or may not branch. A channel may be linear or nonlinear. Exemplary nonlinear channels include a channel extending along a planar flow path (e.g., a serpentine channel), a nonplanar flow path (e.g., a helical channel to provide a helical flow path). Any of the channels disclosed herein may be a microfluidic channel, which is a channel having a characteristic transverse dimension (e.g., the channel's average diameter) of less than about one millimeter. Channels also may include one or more venting mechanisms or dead-ends to allow fluid to enter/exit without the need for an open outlet. Examples of venting mechanisms include, but are not limited to, hydrophobic vent openings or the use of porous materials to either make up a portion of the channel or to block an outlet if present. Examples of dead-ends include, but are not limited to, air tanks.

The term "continuous phase", also referred to as "carrier phase", "carrier", and/or "background phase", refers to a liquid or semi-liquid material into which an immiscible material, such as a dispersed phase, is dispersed, such as, e.g., to form an emulsion.

Examples of continuous phase for use in microfluidic systems are well known to the one skilled in the art and include, without limitation, oils, such as fluorinated oils, silicon oil, hydrocarbon oil and the like.

Examples of suitable fluorinated oils include, but are not limited to, perfluoro-hexane, perfluoro-cyclohexane, perfluoro-decaline, perfluoro-perhydrophenantrene, poly-hexafluoropropylene oxide (such as poly-hexafluoropropylene oxide with carboxylic end group), perfluoro polytrimethylene ether, poly perfluoroalkylene oxide, fluorinated amines (such as N-bis(perfluorobutyl)-N-trifluoromethylamine, tri(perfluoropentyl)amine, mixture of perfluorooctane amine and perfluoro-1-oxacyclooctane amine, or perfluorotripropylamine), fluorinated ethers (such as mixture of methyl nonafluorobutyl ether and methyl nonafluoroisobutyl ether), 3-ethoxy-1,1,1,2,3,4,4,5,5,6,6,6-dodecafluoro-2-(trifluoromethyl)-hexane, 2,3,3,4,4-pentafluorotetrahydro-5-methoxy-2,5-bis[1,2,2,2-tetrafluoro-1-trifluoromethyl) ethyl]-furan, and mixtures thereof.

In some embodiments, the continuous phase may further comprise a surfactant, in particular a fluorinated surfactant (i.e., comprising at least one fluorine atom). Examples of suitable surfactant include, but are not limited to, perfluorooctanol, 1H,1H,2H,2H-perfluoro-1-octanol, perfluoro-decanol, 1H,1H,2H,2H-perfluoro-1-decanol, perfluoro-tetradecanoic acid, perfluoro-tetradecanoic oligo ethylene glycol, perfluoropolyether, perfluoropolyether-polyethylene glycol, perfluoropolyether-polyethylene glycol-perfluoropolyether, perfluoropolyether-dimorpholinophosphate, polyhexafluoropropylene oxide carboxylate, polyhexafluoropropylene oxide-polyethylene glycol-polyhexafluoropropylene oxide, polyhexafluoropropylene oxide-polyether-polyhexafluoropropylene oxide, polyhexafluoropropylene oxide-polypropylene glycol-polyethylene glycol-polypropylene glycol-polyhexafluoropropylene oxide, and mixtures thereof. Other exemplary surfactants include, without limitation, Span80 (Sigma), Span80/Tween-20 (Sigma), Span80/Triton X-100 (Sigma), Abil EM90 (Degussa), Abil we09 (Degussa), polyglycerol polyricinoleate PGPR90 (Danisco), Tween-85, 749 Fluid (Dow Corning), the ammonium carboxylate salt of Krytox 157 FSL (Dupont), the ammonium carboxylate salt of Krytox 157 FSM (Dupont), and the ammonium carboxylate salt of Krytox 157 FSH (Dupont).

Exemplary oil formulations to generate PCR-stable emulsions for flow-through assays are commercially available and well known by the skilled artisan. An example of such formulation includes the following mix: Dow Corning 5225C Formulation Aid (10% active ingredient in decamethylcyclopentasiloxane), 20% w/w, 2% w/w final concentration active ingredient; Dow Corning 749 Fluid (50% active ingredient in decamethylcyclopentasiloxane), 5% w/w, 2.5% w/w active ingredient; and poly(dimethylsiloxane) Dow Corning 200® fluid, viscosity 5.0 cSt (25° C.), 75% w/w. Exemplary oil formulations to generate PCR-stable emulsions for batch assays are commercially available and well known by the skilled artisan. An example of such formulation includes the following mix: Dow Corning 5225C Formulation Aid (10% active ingredient in decamethylcyclopentasiloxane), 20% w/w, 2% w/w final concentration active ingredient; Dow Corning 749 Fluid (50% active ingredient in decamethylcyclopentasiloxane), 60% w/w, 30% w/w active ingredient; poly(dimethylsiloxane) Dow Corning 200® fluid, viscosity 5.0 cSt (25° C.), 20% w/w. In some embodiments, the surface tension of the continuous phase/air interface (at room temperature and atmospheric pressure) is larger than about 1 $mN\cdot m^{-1}$, about 2 $mN\cdot m^{-1}$, about 5 $mN\cdot m^{-1}$, about 10 $mN\cdot m^{-1}$, about 20 $mN\cdot m^{-1}$, about 30 $mN\cdot m^{-1}$, about 40 $mN\cdot m^{-1}$, about 50 $mN\cdot m^{-1}$, about 75 $mN\cdot m^{-1}$, about 100 $mN\cdot m^{-1}$, about 250 $mN\cdot m^{-1}$, about 500 $mN\cdot m^{-1}$. In some embodiments, the surface tension at the continuous phase/air interface (at room temperature and atmospheric pressure) ranges from about 1 $mN\cdot m^{-1}$ to about 100 $mN\cdot m^{-1}$, preferably from about 1 $mN\cdot m^{-1}$ to about 50 $mN\cdot m^{-1}$, more preferably from about 1 $mN\cdot m^{-1}$ to about 25 $mN\cdot m^{-1}$, even more preferably from about 5 $mN\cdot m^{-1}$ to about 20 $mN\cdot m^{-1}$.

The term "digital PCR" or "dPCR" refers to a PCR assay performed on portions of a sample to determine the presence/absence, concentration, and/or copy number of a nucleic acid target in the sample, based on how many of the sample portions support amplification of the target. Digital PCR may (or may not) be performed as endpoint PCR. Digital PCR may (or may not) be performed as real-time PCR for each of the partitions. PCR theoretically results in an exponential amplification of a nucleic acid sequence (analyte) from a sample. By measuring the number of amplification cycles required to achieve a threshold level of amplification (as in real-time PCR), one can theoretically calculate the starting concentration of nucleic acid. In practice, however, there are many factors that make the PCR process non-exponential, such as varying amplification efficiencies, low copy numbers of starting nucleic acid, and competition with background contaminant nucleic acid. Digital PCR is generally insensitive to these factors, since it does not rely on the assumption that the PCR process is exponential. In digital PCR, individual nucleic acid molecules are separated from the initial sample into partitions, then amplified to detectable levels. Each partition then provides digital information on the presence or absence of each individual nucleic acid molecule within each partition. When enough partitions are measured using this technique, the digital information can be consolidated to make a statistically relevant measure of starting concentration for the nucleic acid target (analyte) in the sample. The concept of digital PCR may be extended to other types of analytes, besides nucleic acids. In particular, a signal amplification reaction may be utilized to permit detection of a single copy of a molecule of the analyte in individual droplets, to permit data analysis of droplet signals for other analytes (e.g., using an algorithm based on Poisson statistics). Exemplary signal amplification reactions that permit detection of single copies of other types of analytes in droplets include enzyme reactions.

The term "droplet" refers to a small volume of liquid (such as a dispersed phase), typically with a spherical shape, encapsulated by an immiscible fluid (such as a continuous phase). The volume of a droplet and/or the average volume of a population of droplets, may, e.g., be less than about 1 μL (and is therefore termed "microdroplet"), less than about 1 nL, or less than about 1 pL. A droplet (or a population of droplets) may have a diameter (or an average diameter) of less than about 1000 μm, about 100 μm, about 10 μm; or ranging from about 10 μm to about 1000 μm. A droplet may be spherical or non-spherical. A droplet may be a simple droplet or a compound droplet (i.e., a droplet encapsulating at least one droplet). The droplets of an emulsion may have any uniform or non-uniform distribution in the continuous phase. If non-uniform, the concentration of the droplets may vary to provide one or more regions of higher droplet density and one or more regions of lower droplet density in the continuous phase. For example, droplets may sink or float in the continuous phase, may be clustered in one or more packets along a channel or in a storage chamber, may be focused toward the center or perimeter of a flow stream, or the like. In some embodiments of the present invention, a droplet has a diameter (or an average diameter) ranging from about 10 μm to about 150 μm, preferably from about 25 μm to about 125 μm, more preferably from about 50 μm to about 100 μm, even more preferably from about 65 μm to about 80 μm. In some embodiments of the present invention, a droplet has a diameter (or an average diameter) of about 10 μm±5 μm, 20 μm±5 μm, 30 μm±5 μm, 40 μm±5 μm, 50 μm±5 μm, 60 μm±5 μm, 70 μm±5 μm, 80 μm±5 μm, 90 μm±5 μm, 100 μm±5 μm, 110 μm±5 μm, 120 μm±5 μm, 130 μm±5 μm, 140 μm±5 μm, 150 μm±5 μm. In some embodiments of the present invention, a droplet has a diameter (or an average diameter) of about 72 μm±5 μm. The diameter of a droplet can also be mathematically defined as a function of its volume, with the following formula:

$$\text{diameter} = \sqrt[3]{\text{volume} \times \frac{6}{\pi}}.$$

In some embodiments of the present invention, a droplet has a volume (or an average volume) ranging from about 1 pL to about 1 nL, preferably from about 50 pL to about 750 pL, more preferably from about 100 pL to about 500 pL, even more preferably from about 150 pL to about 250 pL. In some embodiments of the present invention, a droplet has a volume (or an average volume) of 1 pL, 10 pL, 25 pL, 50 pL, 75 pL, 100 pL, 125 pL, 150 pL, 175 pL, 200 pL, 225 pL, 250 pL, 275 pL, 300 pL, 400 pL, 500 pL, 600 pL, 700 pL, 800 pL, 900 pL, 1 nL. In some embodiments of the present invention, a droplet has a volume (or an average volume) of 220 pL±20 pL. It will be readily understood by the one skilled in the art that such diameters and/or volumes are subject to a fair margin of error.

The term "emulsion" refers to a composition comprising at least one liquid droplet, in particular a population of liquid droplets, disposed in an immiscible carrier fluid, which also is liquid. The carrier fluid, also termed background fluid, forms the "continuous phase". The droplets are formed by at least one droplet fluid (typically, a sample), also termed a foreground fluid, which is a liquid forming the "dispersed phase". The dispersed phase is immiscible with the continuous phase, which means that the dispersed phase and the continuous phase do not mix to attain homogeneity. In some embodiments, the density of the dispersed phase is at least about 1% smaller, preferably at least about 5% smaller, about 10%, about 20%, about 30%, about 40%, about 50%, about 75%, about 100%, about 150%, about 200% smaller than the density of the continuous phase. The droplets are isolated from one another by the continuous phase and encapsulated (i.e., enclosed or surrounded) by the continuous phase. Any of the emulsions disclosed herein may be monodisperse, that is, composed of a population of droplets of at least generally uniform size, or may be polydisperse, that is, composed of a population of droplets of various sizes. If monodisperse, the droplets of the emulsion may, e.g., vary in volume by a standard deviation that is less than about plus or minus 100%, 50%, 20%, 10%, 5%, 2%, or 1% of the average droplet volume. Droplets generated from an orifice or from a droplet generator may be monodisperse or polydisperse. An emulsion may have any suitable composition. The emulsion may be characterized by the predominant liquid compound or type of liquid compound in each phase. The predominant liquid compounds in the emulsion may be water and oil. For example, any of the emulsions disclosed herein may be a water-in-oil (W/O) emulsion (i.e., aqueous droplets in a continuous oil phase). Any other suitable components may be present in any of the emulsion phases (dispersed and/or continuous), such as at least one surfactant, reagent, sample (i.e., partitions thereof), other additive, label, particles, or any combination thereof. Standard emulsions become unstable when heated (e.g., to temperatures above 60° C.) when they are in a packed state (e.g., each droplet is near a neighboring droplet), because heat generally lowers interfacial tensions, which can lead to droplet coalescence. Thus, standard packed emulsions do not maintain their integrity during high-temperature reactions, such as PCR, unless emulsion droplets are kept out of contact with one another or additives (e.g., other oil bases, surfactants, etc.) are used to modify the stability conditions (e.g., interfacial tension, viscosity, steric hindrance, etc.). For example, the droplets may be arranged in single file and spaced from one another along a channel to permit thermal cycling in order to perform PCR. However, following this approach using a standard emulsion does not permit a high density of droplets, thereby substantially limiting throughput in droplet-based assays. Any emulsion disclosed herein may be a heat-stable emulsion. A "heat-stable emulsion" is any emulsion that resists coalescence when heated to at least 50° C. A heat-stable emulsion may be a PCR-stable emulsion, which is an emulsion that resists coalescence throughout the thermal cycling of PCR (e.g., to permit performance of digital PCR). Accordingly, a PCR-stable emulsion may be resistant to coalescence when heated to at least 80° C. or 90° C., among others. Due to heat stability, a PCR-stable emulsion, in contrast to a standard emulsion, enables PCR assays to be performed in droplets that do not coalesce during thermal cycling. Accordingly, digital PCR assays with PCR-stable emulsions may be substantially more quantitative than with standard emulsions. An emulsion may be formulated as PCR stable by, e.g., proper selection of carrier fluid and surfactants, among others.

The term "endpoint PCR" refers to a PCR-based analysis in which amplicon formation is measured after the completion of thermal cycling.

The term "interface", when referring to the interface between a continuous phase and a dispersed phase, between a continuous phase and an air phase (simply referred to as air) or between a dispersed phase and an air phase, describes a surface forming the common boundary between two adjacent immiscible or partially immiscible phases.

The term "microfluidic channel" refers to a confined channel provided within or on a substrate, where at least one cross-sectional dimension of the channel ranges from about 0.1 μm to about 1 mm. In particular, the term "precision microfluidic channel" as used herein refers to a microfluidic channel having a precision level of ±5% over its smallest dimension ranging from about 0.1 μm to about 200 μm.

The term "microfluidic chip" refers to a substrate containing microfluidic channels, wherein volumes down to picoliters (pL) are handled within the microfluidic channels of the microfluidic chip. A wide variety of methods and materials exists and will be known and appreciated by the one skilled in the art for construction of microfluidic channels and networks thereof. For example, the microfluidic channel may be constructed using simple tubing, but may further involve sealing the surface of one slab comprising etched open channels to a second flat slab. Materials into which microfluidic channels may be formed include silicon, glass, polydimethylsiloxane (PDMS), and plastics (such as polymethylmethacrylate, cyclic olefin polymer [COP], cyclic olefin copolymer [COC], polypropylene, among others). The same materials can also be used for the second sealing slab. Compatible combinations of materials for the two slabs depend on the method employed to seal them together. The microfluidic channel may be encased as necessary in an optically clear material to allow for optical excitation (resulting in, e.g., fluorescence) or illumination (resulting in, e.g., selective absorption) of a sample as necessary, and to allow for optical detection of spectroscopic properties of light from a sample in the microfluidic chip. Preferred examples of such optically clear materials that exhibit high optical clarity and low autofluorescence include, but are not limited to, borosilicate glass (e.g., SCHOTT BOROFLOAT® glass [Schott North America, Elmsford NY]) and cyclo-olefin polymers (COP) (e.g., ZEONOR® [Zeon Chemicals LP, Louisville KY]).

The term "microfluidics network" refers to an assembly for manipulating fluid, generally by transferring fluid between compartments of the assembly and/or by driving flow of fluid along and/or through one or more flow paths defined by the assembly. A microfluidics network may include any suitable structure, such as one or more channels, chambers, wells, reservoirs, valves, pumps, thermal control devices (e.g., heaters/coolers), sensors (e.g., for measuring temperature, pressure, flow, etc.), or any combination thereof, among others. Microfluidic networks may be constructed using simple tubing, but may further involve sealing the surface of one slab comprising etched open structures as defined above, to a second flat slab.

The term "nucleic acid" refers to both DNA or RNA, whether it be a product of amplification, synthetically created, products of reverse transcription of RNA or naturally occurring. Typically, nucleic acids are single- or double-stranded molecules and are composed of naturally occurring nucleotides. Double-stranded nucleic acid molecules can have 3' or 5' overhangs and as such are not required or assumed to be completely double-stranded over their entire length. Furthermore, the term nucleic acid can be composed of non-naturally occurring nucleotides and/or modifications to naturally occurring nucleotides. Examples are listed herein, but are not limited to, phosphorylation of 5' or 3' nucleotides to allow for ligation or prevention of exonuclease degradation/polymerase extension, respectively; amino, thiol, alkyne, or biotinyl modifications for covalent and near covalent attachments; fluorphores and quenchers; phosphorothioate, methylphosphonates, phosphoroamidates and phosphorotiester linkages between nucleotides to prevent degradation; methylation; and modified bases such as deoxyinosine, 5-bromo dU, deoxyuridine, 2-aminopurine, dideoxycytidine, 5-methyl dC, locked nucleic acids (LNA's), iso-dC and -dG bases, 2'-O-methyl RNA bases and fluorine modified bases.

The term "nucleotide" in addition to referring to the naturally occurring ribonucleotide or deoxyribonucleotide monomers, shall herein be understood to refer to related structural variants thereof, including derivatives and analogs, that are functionally equivalent with respect to the particular context in which the nucleotide is being used (e.g., hybridization to a complementary base), unless the context clearly indicates otherwise.

The term "oil" refers to any liquid compound or mixture of liquid compounds that is immiscible with water and that has a low polarity. In some embodiments, oil also may have a high content of carbon, hydrogen, fluorine, silicon, oxygen, or any combination thereof, among others. Suitable examples of oil include, but are not limited to, silicone oil, mineral oil, fluorocarbon oil, vegetable oil, or a combination thereof, among others.

The term "operatively coupled" is used herein to describe the connection between two or more individual instruments being part of the system according to the present description. Two or more individual instruments are "operatively coupled" if they are arranged such that two or more methods are performed by the two or more individual instruments and said two or more methods appear as one single workflow. In addition, a full integration of two or more individual instruments in a third integrated instrument is possible as well. Another possibility is to integrate different key features of the individual instruments mentioned above in a dedicated integrated device (e.g., a single microfluidic chip containing areas for microfluidic droplet generation, PCR amplification and droplet read-out).

The term "partition" refers to a separated portion of a bulk volume. The partition may be a sample partition generated from a sample, such as a prepared sample, that forms the bulk volume. Partitions generated from a bulk volume may be substantially uniform in size or may have distinct sizes (e.g., sets of partitions of two or more discrete, uniform sizes). Exemplary partitions are "droplets". Partitions may also vary in size with a predetermined size distribution or with a random size distribution.

The term "PCR" or "polymerase chain reaction" refers to a nucleic acid amplification assay that relies on alternating cycles of heating and cooling (i.e., thermal cycling) to achieve successive rounds of replication. PCR may be performed by thermal cycling between two or more temperature set points, such as a higher melting (denaturation) temperature and a lower annealing/extension temperature, or among three or more temperature set points, such as a higher melting temperature, a lower annealing temperature, and an intermediate extension temperature, among others. PCR may be performed with a thermostable polymerase, such as Taq DNA polymerase (e.g., wild-type enzyme, a Stoffel fragment, FastStart polymerase, etc.), Pfu DNA polymerase, S-Tbr polymerase, Tth polymerase, Vent polymerase, or a combination thereof, among others. PCR generally produces an exponential increase in the amount of a product amplicon over successive cycles. Any suitable PCR methodology or combination of methodologies may be utilized in the droplet-based assays disclosed herein, such as allele-specific PCR, assembly PCR, asymmetric PCR, digital PCR, endpoint PCR, hot-start PCR, in situ PCR, intersequence-specific PCR, inverse PCR, linear after exponential PCR, ligation-mediated PCR, methylation-specific PCR, miniprimer PCR, multiplex ligation-dependent probe amplification, multiplex PCR, nested PCR, overlap-extension PCR, polymerase cycling assembly, qualitative PCR, quantitative PCR, real-time PCR, RT-PCR, single-cell PCR, solid-phase PCR, thermal asymmetric interlaced PCR, touchdown PCR, or universal fast walking PCR, among others.

The term "qualitative PCR" refers to a PCR-based analysis that determines whether or not a target is present in a sample, generally without any substantial quantification of target presence. In exemplary embodiments, digital PCR that is qualitative may be performed by determining whether a packet of droplets contains at least a predefined percentage of positive droplets (a positive sample) or not (a negative sample).

The terms "quantitative PCR", "qPCR", "real-time quantitative polymerase chain reaction" or "kinetic polymerase chain reaction" refer to a PCR-based analysis that determines a concentration and/or copy number of a target in a sample. This technique simultaneously amplifies and quantifies target nucleic acids using PCR wherein the quantification is by virtue of an intercalating fluorescent dye or sequence-specific probes which contain fluorescent reporter molecules that are only detectable once hybridized to a target nucleic acid.

The term "reaction" refers to a chemical reaction, a binding interaction, a phenotypic change, or a combination thereof, which generally provides a detectable signal (e.g., a fluorescence signal) indicating occurrence and/or an extent of occurrence of the reaction. An exemplary reaction is an enzyme reaction that involves an enzyme-catalyzed conversion of a substrate to a product. Any suitable enzyme reactions may be performed in the droplet-based assays disclosed herein. For example, the reactions may be catalyzed by a kinase, nuclease, nucleotide cyclase, nucleotide ligase, nucleotide phosphodiesterase, polymerase (DNA or RNA), prenyl transferase, pyrophospatase, reporter enzyme (e.g., alkaline phosphatase, beta-galactosidase, chloramphenicol acetyl transferase, glucuronidase, horse radish peroxidase, luciferase, etc.), reverse transcriptase, topoisomerase, etc.

The term "reagent" refers to a compound, set of compounds, and/or composition that is combined with a sample in order to perform a particular assay(s) on the sample. A reagent may be a target-specific reagent, which is any reagent composition that confers specificity for detection of a particular target(s) or analyte(s) in an assay. A reagent optionally may include a chemical reactant and/or a binding partner for the assay. A reagent may, for example, include at least one nucleic acid, protein (e.g., an enzyme), cell, virus, organelle, macromolecular assembly, potential drug, lipid, carbohydrate, inorganic substance, or any combination thereof, and may be an aqueous composition, among others.

In exemplary embodiments, the reagent may be an amplification reagent, which may include at least one primer or at least one pair of primers for amplification of a nucleic acid target, at least one probe and/or dye to enable detection of amplification, a polymerase, nucleotides (dNTPs and/or NTPs), divalent magnesium ions, potassium chloride, buffer, or any combination thereof, among others.

The term "real time PCR" refers to a PCR-based analysis in which amplicon formation is measured during the reaction, such as after completion of one or more thermal cycles prior to the final thermal cycle of the reaction. Real-time PCR generally provides quantification of a target based on the kinetics of target amplification.

The term "replication" refers to a process forming a copy (i.e., a direct copy and/or a complementary copy) of a nucleic acid or a segment thereof. Replication generally involves an enzyme, such as a polymerase and/or a ligase, among others. The nucleic acid and/or segment replicated is a template (and/or a target) for replication.

The term "reporter" refers to a compound or set of compounds that reports a condition, such as the extent of a reaction. Exemplary reporters comprise at least one dye, such as a fluorescent dye or an energy transfer pair, and/or at least one oligonucleotide. Exemplary reporters for nucleic acid amplification assays may include a probe and/or an intercalating dye (e.g., SYBR Green, ethidium bromide, etc.).

The terms "reverse transcription PCR" or "RT-PCR" refer to a PCR assay utilizing a complementary DNA template produced by reverse transcription of RNA. RT-PCR permits analysis of an RNA sample by (1) forming complementary DNA copies of RNA, such as with a reverse transcriptase enzyme, and (2) PCR amplification using the complementary DNA as a template. In some embodiments, the same enzyme, such as Tth polymerase, may be used for reverse transcription and PCR.

The term "sample" refers to a compound, composition, and/or mixture of interest, from any suitable source(s). A sample is the general subject of interest for an assay that analyzes an aspect of the sample, such as an aspect related to at least one analyte that may be present in the sample. Samples may be analyzed in their natural state, as collected, and/or in an altered state, for example, following storage, preservation, extraction, lysis, dilution, concentration, purification, filtration, mixing with one or more reagents, pre-amplification (e.g., to achieve target enrichment by performing limited cycles (e.g., <15) of PCR on sample prior to PCR), removal of amplicon (e.g., treatment with uracil-d-glycosylase (UDG) prior to PCR to eliminate any carry-over contamination by a previously generated amplicon (i.e., the amplicon is digestable with UDG because it is generated with dUTP instead of dTTP)), partitioning, or any combination thereof, among others. Clinical samples may include nasopharyngeal wash, blood, plasma, cell-free plasma, buffy coat, saliva, urine, stool, sputum, mucous, wound swab, tissue biopsy, milk, a fluid aspirate, a swab (e.g., a nasopharyngeal swab), and/or tissue, among others. Environmental samples may include water, soil, aerosol, and/or air, among others. Research samples may include cultured cells, primary cells, bacteria, spores, viruses, small organisms, any of the clinical samples listed above, or the like. Additional samples may include foodstuffs, weapons components, biodefense samples to be assayed for bio-threat agents, suspected contaminants, and so on. Samples may be collected for diagnostic purposes (e.g., the quantitative measurement of a clinical analyte such as an infectious agent) or for monitoring purposes (e.g., to determine that an environmental analyte of interest such as a bio-threat agent has exceeded a predetermined threshold). In some embodiments, the sample may comprise one or several reagents, such as, e.g., an amplification mixture.

In some embodiments, a drop of sample has a diameter ranging from about 1 mm to about 5 mm, preferably from about 1 mm to about 4.5 mm, more preferably from about 1 mm to about 4 mm, even more preferably from about 1 mm to about 3.5 mm, even more preferably from about 2 mm to about 3 mm. In some embodiments, a drop of sample has a diameter of about 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm or more. In some embodiments, a drop of sample has a diameter of about 2.5 mm±0.2 mm.

In some embodiments, a drop of sample has a volume ranging from about 1 μL to about 75 μL, preferably from about 1 μL to about 50 μL, more preferably from about 1 μL to about 40 μL, even more preferably from about 1 μL to about 20 μL, even more preferably from about 5 μL to about 10 μL. In some embodiments, a drop of sample has a volume of about 1 μL, 2 μL, 3 μL, 4 μL, 5 μL, 6 μL, 7 μL, 8 μL, 9 μL, 10 μL, 11 μL, 12 μL, 13 μL, 14 μL, 15 μL, 20 μL, 25 μL, 30 μL, 35 μL, 40 μL, 45 μL, 50 μL, 55 μL, 60 μL, 65 μL, 70 μL, 75 μL or more. In some embodiments, a drop of sample has a volume of about 8 μL±2 μL.

The term "surfactant" refers to a surface-active agent capable of modifying the surface tension between two phases. A surfactant, which also or alternatively may be described as a detergent and/or a wetting agent, incorporates both a hydrophilic portion and a hydrophobic portion, which collectively confer a dual hydrophilic-lipophilic character on the surfactant. The emulsions disclosed herein and/or any phase thereof, may include at least one hydrophilic surfactant, at least one lipophilic surfactant, or a combination thereof. Alternatively, or in addition, the emulsions disclosed herein and/or any phase thereof, may include at least one nonionic (and/or ionic) detergent. Furthermore, an emulsion disclosed herein and/or any phase thereof may include a surfactant comprising polyethyleneglycol, polypropyleneglycol or Tween 20, among others.

DETAILED DESCRIPTION

The following detailed description will be better understood when read in conjunction with the drawings. For the purpose of illustrating, the assembly is shown in the preferred embodiments. It should be understood, however that the application is not limited to the precise arrangements, structures, features, embodiments, and aspect shown. The drawings are not drawn to scale and are not intended to limit the scope of the claims to the embodiments depicted. Accordingly, it should be understood that where features mentioned in the appended claims are followed by reference signs, such signs are included solely for the purpose of enhancing the intelligibility of the claims and are in no way limiting on the scope of the claims.

Figure 1:
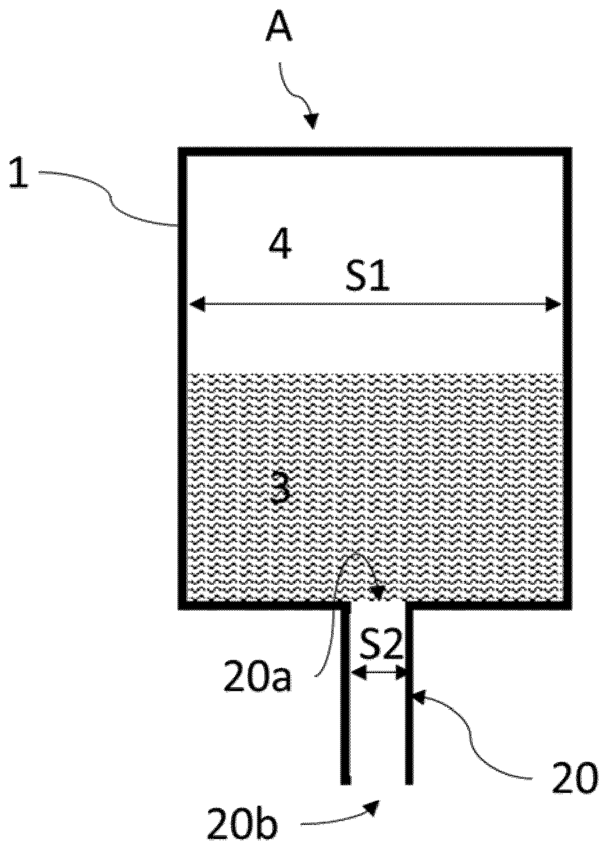
FIG. 1 is a schematic representation of the assembly according to the invention.

As shown in FIG. 1, this invention relates to an assembly A for contactless pressure-controlled release of a fluid 3 comprising a non-compressible fluid compartment 1. This compartment is actually non-compressible and configured to contain fluids. By non-compressible, it is meant that its volume does not change under a variation of outside pressure of 1 atm of more than the volume of one droplet of fluid 3 to be delivered through surface 20*a*. In other words, when outside pressure increases of 1 atm, mechanical deformation of the compartment is negligible as compared to the volume of a droplet of fluid 3 to be delivered through surface 20*a*. It will be designated as non-compressible compartment thereafter. At least two fluids 3 and 4 in fluidic contact are enclosed inside the non-compressible compartment 1, one of the two fluids: 4, being a gas and wherein the fluid 3 to be released has a density superior to the gas 4. Said non-compressible compartment 1 is connected to one channel 20 for fluid flow. The channel 20 extends outward said non-compressible compartment on side 20*a* and has a free end at the other side 20*b*.

With this assembly, pressure inside the non-compressible compartment can be adjusted by external pressure, without connection to a pressure source via a channel. Indeed, ambient gas may be introduced in the non-compressible compartment through the channel and fluid 3, thus increasing pressure within the non-compressible compartment. Reversely, gas 4 contained in the non-compressible compartment may expand if external pressure is lowered, thus forcing fluid 3 out of the non-compressible compartment. Finally, fluid 3 delivery from assembly is controlled by ambient gas pressure, without requiring any connector with the non-compressible compartment and fluid 3 is delivered—just dripping—on any device or chip below the non-compressible compartment, without requiring a specific connector. This mode of operation is referred to as contactless.

The channel 20 is unable to allow a simultaneous double flow. It has section S2 in $m^2$ and a Bond number $$\frac{\Delta\rho \times g \times S2}{\sigma}$$

strictly lower than 1, where:

- Δρ is the difference in $kg/m^3$ of the densities between the gas 4 and the fluid 3 to be released,
- g is the gravitational acceleration which value is 9.80665 $m/s^2$,
- σ is the surface tension in N/m between the gas 4 and the fluid 3 to be released.

In such a configuration, the fluid 3 to be released in a controlled manner does not flow through the channel 20 under gravitational forces only. Fluid 3 is trapped within the compartment 1 with gas 4 on top.

The section S2 of the channel 20 is of course preferably constant, however, if it is not the case and the section evolves as in a cone, it should be taken the lowest section of the channel 20. Preferably, the channel 20 has a hollow cylindrical shape. The section S2 to take into account is the internal one through which the fluid will flow in a controlled manner under pressure. Usually, section S2 of the channel 20 is less than 1 $mm^2$.

As to the non-compressible compartment 1, it has a rectangular shape but can have any other shape as long as the compartment itself is not compressible. The non-compressible compartment 1 is a macrofluidic reservoir with a section S1 in $m^2$ and a Bond number $$\frac{\Delta\rho \times g \times S1}{\sigma}$$

strictly greater than 1, where:

- Δρ is the difference in $kg/m^3$ of the densities between the gas 4 and the fluid 3 to be released,
- g is the gravitational acceleration which value is 9.80665 $m/s^2$,
- σ is the surface tension in N/m between the gas 4 and the fluid 3 to be released.

The section S1 of the non-compressible compartment 1 is of course preferably constant, however, if it is not the case and the section evolves as in a cone or an amphora, it should be taken the lowest section of the non-compressible compartment 1. Preferably, the non-compressible compartment 1 has a hollow cylindrical shape. The section S1 to take into account is the internal one through which the fluid will flow. Usually, section S1 of the non-compressible compartment 1 is greater than 10 $mm^2$.

In an embodiment, the fluid 3 to be released is a solution, i.e. it does not contain any dispersed solid particles.

In an embodiment, fluid 3 to be released is non-volatile, which means here that boiling point under pressure of 1 atm is greater than 80° C. Boiling point under pressure of 1 atm is preferably greater than 100° C., more preferably greater than 150° C., even more preferably greater than 150° C. Fluids 3 having boiling point under pressure of 1 atm greater than 200° C. or 250° C. are especially preferred.

In particular, fluid 3 is a single pure liquid, such as perfluoro-hexane, perfluoro-cyclohexane, perfluoro-decaline, perfluoro-perhydrophenantrene, poly-hexafluoropropylene oxide (such as poly-hexafluoropropylene oxide with carboxylic end group), perfluoro polytrimethylene ether, poly perfluoroalkylene oxide, fluorinated amines (such as N-bis(perfluorobutyl)-N-trifluoromethylamine, tri(perfluoropentyl)amine, mixture of perfluorooctane amine and perfluoro-1-oxacyclooctane amine, or perfluorotripropylamine), fluorinated ethers (such as mixture of methyl nonafluorobutyl ether and methyl nonafluoroisobutyl ether), 3-ethoxy-1,1,1,2,3,4,4,5,5,6,6,6-dodecafluoro-2-(trifluoromethyl)-hexane, or 2,3,3,4,4-pentafluorotetrahydro-5-methoxy-2,5-bis[1,2,2,2-tetrafluoro-1-trifluoromethyl) ethyl]-furan. In this embodiment, assembly is suitable to release a fluid on any device and prevent evaporation of liquids already contained in said device.

Thanks to this design a precise pressure-controlled fluid release is obtained, in a contactless manner, dispensing a known liquid quantity without any moving part in the assembly according to the invention and without any contact between the fluids to manipulate and the human controller of the process to which it can be applied. This assembly is suitable to release fluid, in particular oils and non-volatile oils, in any kind of chip, with an accurate control of volume of fluid released and/or with an accurate control of fluid release step during a process.

Besides, liquid dispensing may be implemented in parallel to deliver fluid simultaneously on several locations of a chip, as will be disclosed below.

For example, such assembly can be used for PCR, in such case, the fluid 3 to be release could be an oil and the gas 4 is preferably air. In that case, the channel 20 is in contact with oil on one side and with air on the other side where a well 112 for microfluidic chip could be positioned.

Figure 2:
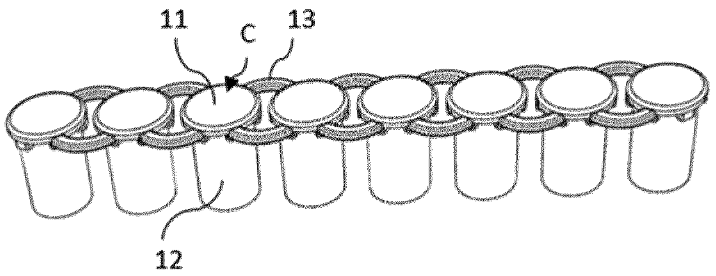
FIG. 2 is a perspective view of an array of caps for an embodiment of assembly according to the invention.

FIG. 2 is a perspective view of an array of caps C for an embodiment of assembly according to the invention. Each cap C is connected to the other thanks to two ring-shaped plastic connectors 13 placed on each side with reference to the direction of alignment of the array of caps C. The cap C is preferably in a polymeric material. It has base 11 with preferably a flat surface so as to allow the array of caps C to be set upside down laying on the base 11 in a stable position. Such stable position will permit filling the fluid 3 to be released by simply pouring it into the internal hollow part of the cap C. Another advantage of such flat base 11 is to serve as a support for mechanical stabilization of the assembly according to the invention if a stabilizing mean needs support to avoid assembly deformation during heating for example during thermocycles of a particular type of PCR using a microchip mechanically coupled to the assembly according to the invention. The cap C preferably ha a cylindrical shape but it can also have a conical shape. In a preferred embodiment, the walls 12 of the cap C have an elastic behavior so as to facilitate coupling with another part such as a fluid receiving vessel 2 in a fluid tight manner as depicted in FIG. 3.

Figure 3:
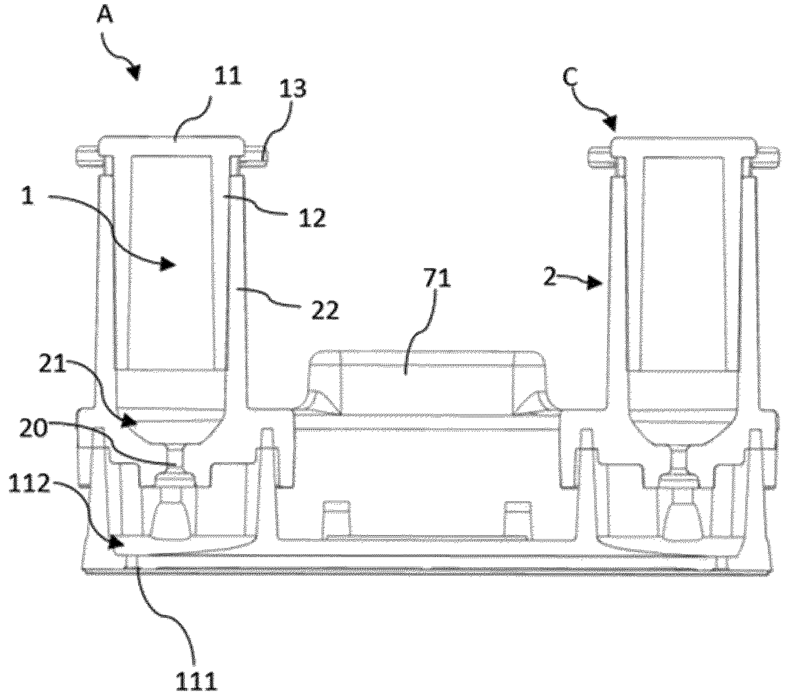
FIG. 3 is a cross sectional view of an array of assemblies according to the invention.

FIG. 3 depicts a cross sectional view of an array of assemblies according to the invention with caps C mechanically coupled to a fluid receiving vessel 2. Two arrays of assemblies are represented, the plurality of parallel arrays of assemblies A are linked to one another by one longitudinal bridge 71. The longitudinal bridge 71 extends perpendicularly to the longitudinal alignment of assemblies A joining two parallel arrays to facilitate manipulation of multiple assemblies. This is useful if different analytes must be analyzed or processed for PCR for instance and a fluid must be released on the well 112.

In FIG. 3, which is a preferred embodiment, the non-compressible compartment 1 is obtained by fitting the cap C with its base 11 and lateral wall external surface 12, to a fluid receiving vessel 2 comprising its base 21, the channel 20 for fluid flow and lateral wall internal surface 22. The fitting is done so that the cap lateral wall external surface 12 and the fluid receiving vessel lateral wall internal surface 22 form a fluid tight seal, contacting each other via the wall surfaces. The channel 20 in in contact on one side with the fluid 3 to be released and on the other side with air in the volume of the loading well 112.

Figure 4:
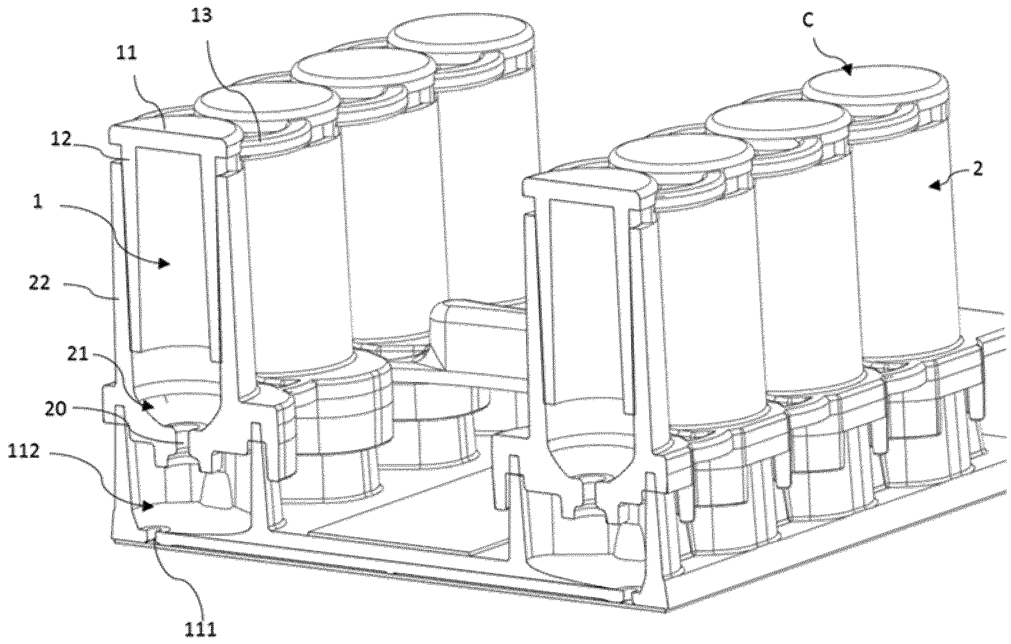
FIG. 4 is a perspective cross sectional view of an array of assemblies according to the invention.

FIG. 4 is simply a perspective view of FIG. 3 for better understanding the double array of assemblies A according to the invention.

Figure 5:
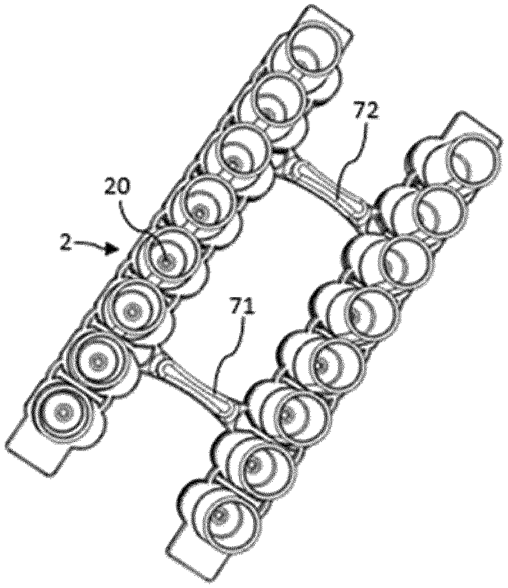
FIG. 5 is a top view of an array of parallel fluid receiving vessels.

FIG. 5 focuses on the fluid receiving vessel 2 and its channel 20 for fluid flow. It represents two parallel arrays of fluid receiving vessel 2. The channel 20 is preferably located in the central position of the cylindrical base of fluid receiving vessel 2. It must not be facing the loading well outlet 111. Indeed, since the loading well 112 may contain droplets to be analyzed, it must be avoided to release a fluid directly in the loading well outlet 111 unless we want the fluid to be released to enter directly in the distribution area of the microfluidic chip microchannels (cf. FIG. 9).

In FIG. 5, one can also distinguish the two connecting bridges 71 and 72, that are here longitudinal bridges extending perpendicular to the parallel alignment array of assemblies A. each bridge has a projection perpendicular to the longitudinal extending bridge plane. Such projection presents a central section small than the extremities to improve flexibility of the connection. Indeed, deformations may take place when the assembly according to the invention is submitted to thermal cycles or high pressure and the connecting bridge must be able to accommodate such deformation.

Figure 6:
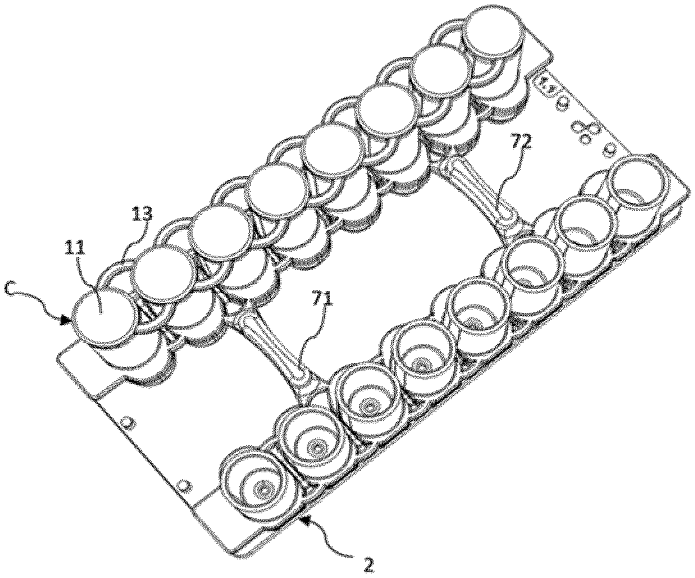
FIG. 6 is a top view of an array of parallel fluid receiving vessels one array being an assembly according to the invention.

FIG. 6 depicts two parallel arrays of fluid receiving vessel 2, one of the arrays being coupled with a corresponding array of caps according to the invention.

Figure 7:
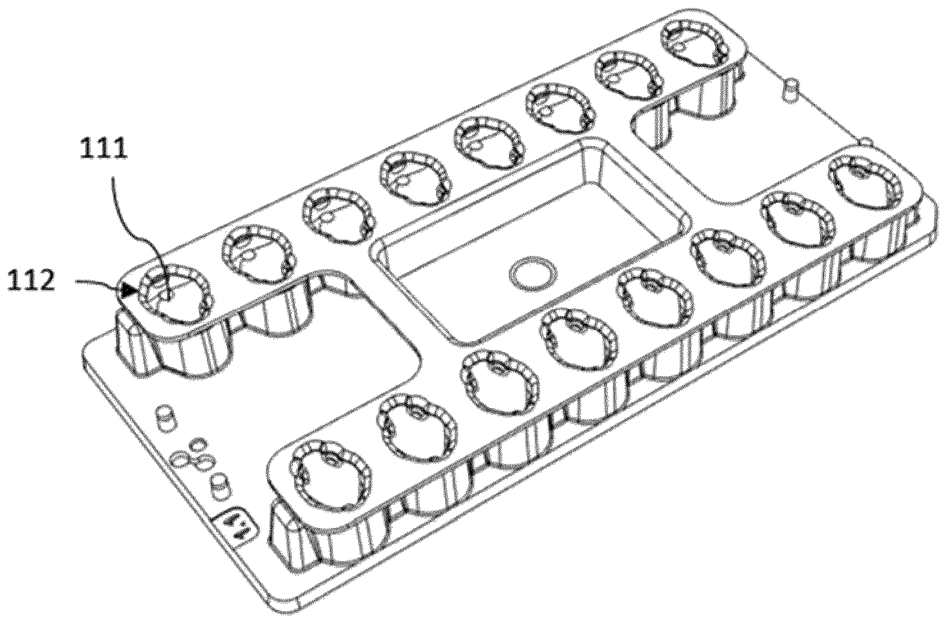
FIG. 7 is a top view of an array of parallel loading wells.

In FIG. 7, one can see an array of individual loading wells 112 along with their associated loading well outlet 111. Each loading well outlet 111 is offset with regards to the output of the fluid receiving vessel channel 20 output. This avoids releasing the fluid 3 directly into the microfluidic chip microchannels. It is here reminded that in a preferred embodiment according to the invention, the fluid to be released is not the one to be analyzed. If that was the case, aligning vertically the channel 20 and the loading well outlet 111 would be a preferred embodiment.

Figure 8:
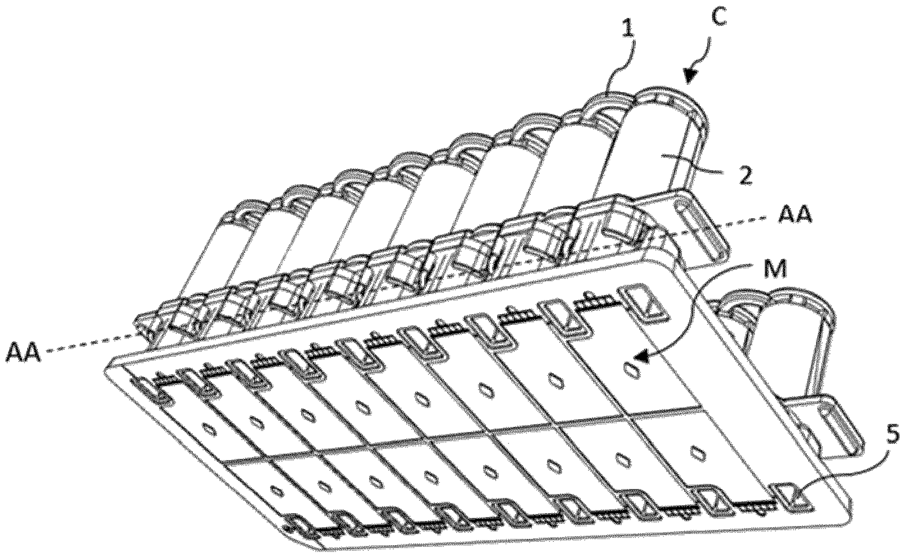
FIG. 8 is a perspective view of the assembly according to the invention operatively coupled with a microfluidic chip.

In FIG. 8 is depicted a microfluidic chip M with its networks 6. An array of assemblies according to the invention is set on top of the microfluidic chip M so to release a fluid 3 if necessary.

Figure 9:
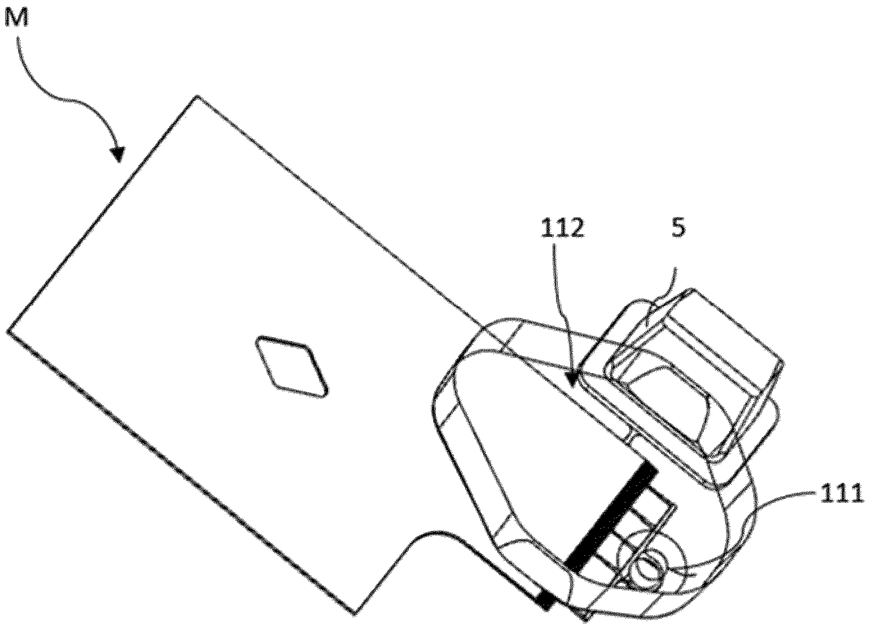
FIG. 9 is a perspective cut view along the line AA of FIG. 8 with the loading well on top of a microfluidic chip shown for clarity.

FIG. 9 is a perspective cut view along the line AA of FIG. 8 with the loading well 112 on top of a microfluidic chip M shown for clarity. An air tank 5 is also represented. Basically, the loading well 112 is configured to reduce the dead volume of a drop of sample (droplet) to be loaded in the microfluidic chip M. Typically, in a biphasic microfluidic chip, a continuous phase is loaded first and fills at least partially the microfluidic network. For instance, in the presence of an air tank 5, the microfluidic chip M is only partially filled with the continuous phase and the air tank 5 is globally filled with air, before placing a drop of dispersed phase (typically, a sample to analyze) in the loading well 112, at the continuous phase/air interface. Moving the sample to analyze to a defined location within the loading well 112 and trapping it at said defined location is required to perform a reproducible loading of the sample to analyze into the microfluidic network, while reducing the dead volume of the sample upon loading.

The air tank 5 is operatively coupled to the droplet chamber where the microfluidic channels 6 lead to the samples to be processed/analyzed.

We will now describe a method according to the invention where oil is the fluid to be released, the gas is gas and a layer of oil is to be dispensed in the volume of the loading well 112 where a droplet is to be processed/analyzed.

For instance; a droplet (not represented) is placed in a loading well 112 and is covered with a continuous phase that is here the same as the oil to release. The oil touches the bottom wall part of the loading well while deforming the continuous phase/air interface. Such deformation increases the continuous phase/air contact area, forming a meniscus. Due to surface tension, the system ultimately evolves toward lowering said continuous phase/air contact area.

This phenomenon moves and traps the droplet (not represented) towards the position of higher depth of the loading well 112, which is the loading well outlet. This droplet will be later injected into the loading well outlet, then the chip, by application of an external pressure. To prevent any evaporation phenomenon that may take place during subsequent thermal cycle due to a PCR process for example, a film of non-volatile oil has to be deposited in the loading well. This is done with assembly A.

Thus, to do so, the invention relates also to a method for forming an assembly A according to the invention, comprising the successive following steps:

- Filling a cap C comprising a base 11 and a lateral wall external surface 12 with the fluid 3 to be released,
- Fitting said cap C with a receiving vessel 2 comprising a channel 20 for fluid flow and lateral wall internal surface 22, so that the cap lateral wall external surface 12 and the fluid receiving vessel lateral wall internal surface 22 form a fluid tight seal.

Figure 10:
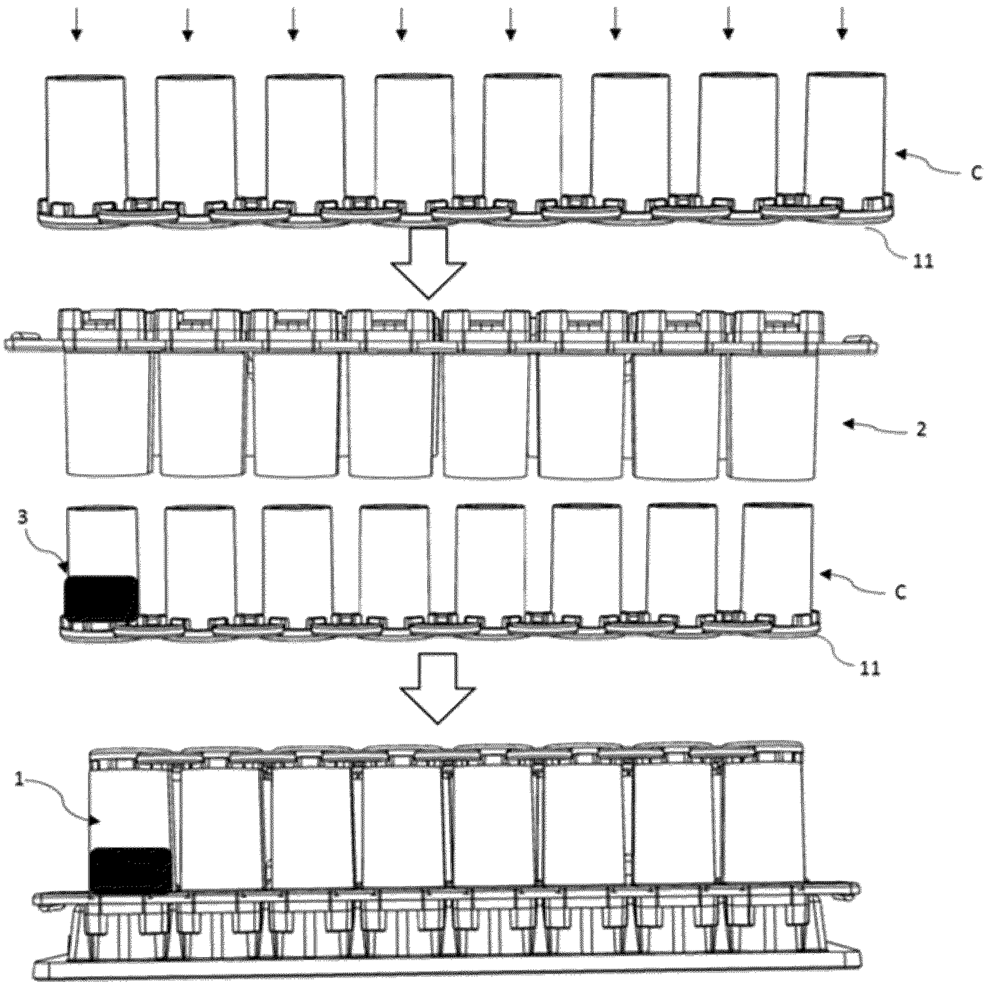
FIG. 10 illustrates the process steps according to an embodiment of the invention.

Such method is detailed in FIG. 10 where, from top to bottom, a fluid to release 3 is first poured inside the cap C. One can notice that the cap C is laid base facing down on its basis 11 thanks to the flat surface of said base 11.

Then the complementary fluid receiving vessel 2 is coupled to the cap C so that the cap lateral wall external surface 12 and the fluid receiving vessel lateral wall internal surface 22 form a fluid tight seal as in FIG. 3, thus trapping the fluid to release 3 with gas 4 inside the non-compressible compartment 1.

In a further preferred embodiment, the array of assemblies according to the invention comprising a droplet to analyze/process is put into an apparatus comprising a pressure controller in a configuration where the cap C is on top of the receiving vessel 2. Then a pressure cycle is implemented so as to release the fluid 3 from the fluid receiving vessel 2 to the loading well 112 and simultaneously to inject droplet into the loading well outlet. Finally, a layer of fluid 3 is deposited in the loading well and prevent evaporation of the injected droplet.

Figure 11:
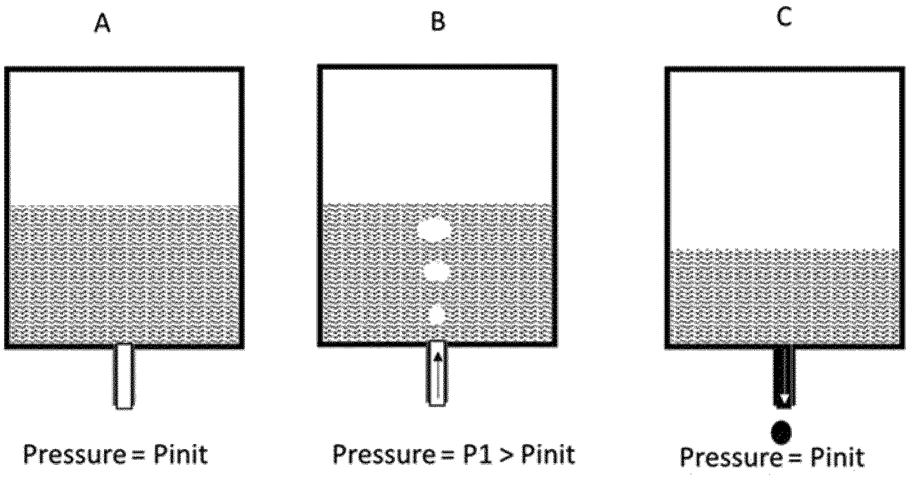
FIG. 11 illustrates process steps according to an embodiment of the invention for fluid release.

As a first example of cycle, one can refer to FIG. 11 where: the initial pressure is defined as Pinit. In configuration A, the oil does not drop because the channel 20 does not allow a simultaneous double flow (air in, liquid out) and this is also due to the volume of the compartment 1 that is non compressible. In configuration B, the pressure is increased and the compartment 1 being non compressible, some ambient gas from the loading well 112 gets injected into the compartment 1 through the channel 20.

As soon as it enters into the compartment 1, the injected gas turns into bubbles and rises up thanks to gravity.

During subsequent pressure decrease back to initial pressure Pinit (configuration C), the compressible volume 4 (gas) expands and the compartment 1 being non compressible, the fluid 3 to be released, i.e. the oil, gets ejected out of the compartment 1 through the channel 20 down to the loading well 112.

This first example of cycle may be repeated several times. In particular, a cycle may be designed according to fluid 3 viscosity and surface tension, according to channel 20 and non-compressible compartment 1 dimensions so as to release one drop of fluid 3. Then, repeating the determined cycle allows to deliver a given number of drops, for instance two drop, three drops, four drops or five drops, depending on the size of the loading well 112 in which fluid 3 is released.

As a second example of cycle, instead of a cycle of pressure increase followed by pressure decrease down to the initial pressure Pinit, the pressure will first be decreased followed by pressure increase up to the initial pressure Pinit.

Figure 12:
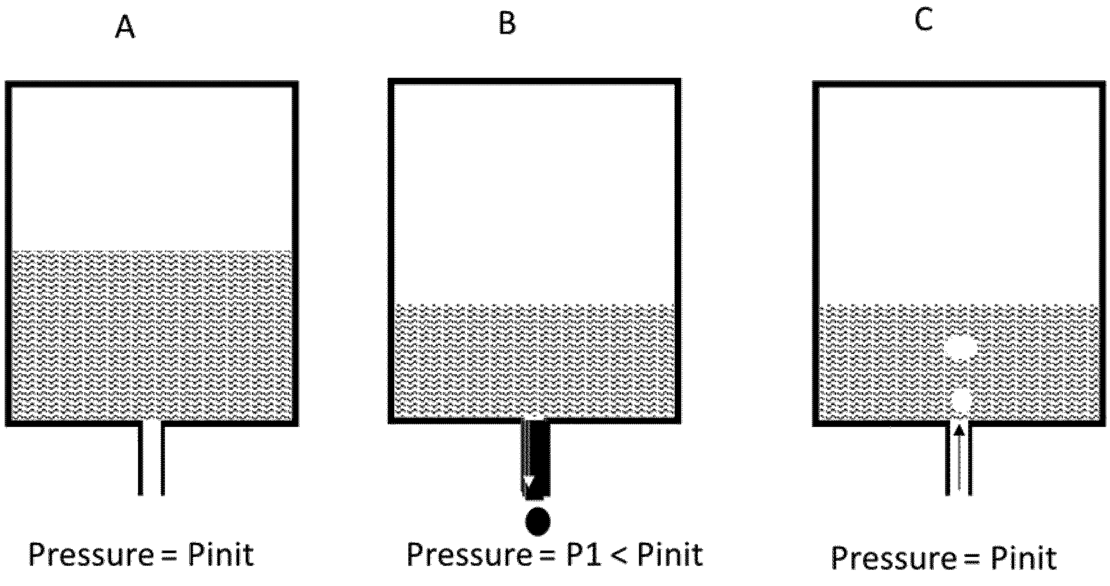
FIG. 12 illustrates process steps according to another embodiment of the invention for fluid release.

Referring to FIG. 12, at configuration A, the oil does not drop because the channel 20 does not allow a simultaneous double flow (air in, liquid out) and this is also due to the volume of the compartment 1 that is non compressible. In configuration B, the pressure is decreased, the compressible gas volume 4 inflates and since compartment 1 is non compressible nor extensible, the fluid to be released, i.e. oil, gets ejected out of the compartment 1 through the channel 20 down to the loading well 112.

During subsequent pressure increase back to initial pressure Pinit (configuration C), gas bubbles flow through channel 20. Since the compartment 1 is non compressible nor extensible, some ambient gas from the loading 112 get sucked into the compartment 1 through the channel 20. As soon as it enters into the compartment 1, the injected gas become bubbles and rise up thanks to gravity.

This second example of cycle may be repeated several times. In particular, a cycle may be designed according to fluid 3 viscosity and surface tension, according to channel 20 and non-compressible compartment 1 dimensions so as to release one drop of fluid 3. Then, repeating the determined cycle allows to deliver a given number of drops, for instance two drop, three drops, four drops or five drops, depending on the size of the loading well 112 in which fluid 3 is released.

With both cycles, a layer of oil is formed on the loading well surface covering it so as to prevent subsequent evaporation phenomenon.

As demonstrated, the method of contactless pressure-controlled fluid releasing according to the invention has the strong advantage of working with a thermocycler no matter if the cycle requires first a pressure increase or decrease. This offers significant flexibility in choosing the apparatus for the pressure cycle to release the fluid 3.

While various embodiments have been described and illustrated, the detailed description is not to be construed as being limited hereto. Various modifications can be made to the embodiments by those skilled in the art without departing from the true spirit and scope of the disclosure as defined by the claims.

REFERENCES

1—non-compressible compartment
11—Cap base
12—Cap lateral wall
13—connecting means
2—fluid receiving vessel
20—channel
21—fluid receiving vessel base
22—fluid receiving vessel lateral wall
3—fluid to be released
4—compressible fluid
5—Air tank
6—Microfluidic chip network
111—loading well outlet
112—well
71,72—connecting bridge
M—Microfluidic chip

The invention claimed is:

1. An assembly comprising:
a gas which is air and a fluid which is an oil, the fluid having a density greater than a density of the gas,
a non-compressible compartment, the gas and the fluid being in fluidic contact and enclosed inside the non-compressible compartment, and
a microfluidic channel for fluid flow, wherein the microfluidic channel comprises
a first end connected to a side of the non-compressible compartment and which is in contact with oil and
a second end which is free from the non-compressible compartment and which is a free end in contact with air,
wherein the microfluidic channel is unable to allow a simultaneous double flow in opposite directions but allows fluid to flow through the microfluidic channel in only one direction at a time, the microfluidic channel having a Bond number $$\frac{\Delta\rho \times g \times S1}{\sigma}$$

strictly less than 1, wherein: Δρ is a difference in kg/m$^3$ of a density of the gas and a density of the fluid,
$S_2$ is a section of the microfluidic channel in m$^2$,
g is gravitational acceleration, and
σ is surface tension in N/m between the gas and the fluid.

2. The assembly of claim 1, wherein the non-compressible compartment is a macrofluidic reservoir having a Bond number $$\frac{\Delta\rho \times g \times S1}{\sigma}$$

strictly greater than 1, wherein $S_1$ is a section of the non-compressible compartment in m$^2$.

3. The assembly of claim 2, wherein the section of the non-compressible compartment is greater than 10 mm$^2$.

4. The assembly of claim 1, wherein the non-compressible compartment comprises a cap and a fluid receiving vessel, wherein the cap comprises a base and a lateral wall external surface and the fluid receiving vessel comprises the microfluidic channel and a lateral wall internal surface, the cap being fitted to the fluid receiving vessel such that the lateral wall external surface of the cap and the lateral wall internal surface of the fluid receiving vessel form a fluid tight seal.

5. The assembly of claim 4, wherein the base of the cap has a flat external surface so as to be stable on a horizontal surface for filling of the fluid.

6. A device comprising at least one array of assemblies according to claim 1, said assemblies being linked to one another by connecting means.

7. The device of claim 6, comprising a plurality of parallel arrays of assemblies, said parallel arrays of assemblies being linked together by at least one connecting bridge.

8. The assembly of claim 1, further comprising a seal on the microfluidic channel to prevent the fluid from escaping before pressure control.

9. An apparatus comprising the assembly of claim 1, further comprising a pressure controller provided to provide the gas enclosed in the non-compressible compartment with a predetermined pressure so as to release the fluid through the microfluidic channel from a fluid receiving vessel to a well.

10. A method for forming the assembly of claim 4 comprising the following steps:
filling the cap with the fluid,
fitting said cap with the fluid receiving vessel, so that the lateral wall external surface of the cap and the lateral wall internal surface of the fluid receiving vessel form a fluid tight seal.

11. A method comprising the steps of:
setting the assembly of claim 4 into an apparatus comprising a pressure controller in a configuration where the cap is on top of the fluid receiving vessel, and
implementing a pressure cycle so as to release the fluid from the fluid receiving vessel to a well.

12. The method of claim 11, wherein the pressure cycle comprises the following steps:
increasing a pressure by at least 20 mbar from atmospheric pressure for gas inlet into the non-compressible compartment; and then
decreasing the pressure back to initial atmospheric pressure for gas expansion so as to release fluid from the fluid receiving vessel to the well.

13. The method of claim 11, wherein the pressure cycle comprises the following steps:
decreasing a pressure by at least 20 mbar from atmospheric pressure for fluid aspiration from the fluid receiving vessel to the well, and then
increasing the pressure back to initial atmospheric pressure.

14. The assembly of claim 1, wherein the section of microfluidic channel is less than 1 mm$^2$.

15. An apparatus comprising the device of claim 6, further comprising a pressure controller provided to provide the gas enclosed in the non-compressible compartment with a predetermined pressure so as to release the fluid through the microfluidic channel from a fluid receiving vessel to a well.

* * * * *